United States Patent
Mathur et al.

(10) Patent No.: US 8,914,142 B2
(45) Date of Patent: Dec. 16, 2014

(54) METHOD AND A SYSTEM FOR OPTIMIZATION OF PARAMETERS FOR A RECOVERY BOILER

(75) Inventors: Tarun Prakash Mathur, Bangalore (IN); Babji Buddhi Srinivasa, Bangalore (IN)

(73) Assignee: ABB Research Ltd, Zurich (CH)

( * ) Notice: Subject to any disclaimer, the term of this patent is extended or adjusted under 35 U.S.C. 154(b) by 674 days.

(21) Appl. No.: 13/209,847

(22) Filed: Aug. 15, 2011

(65) Prior Publication Data

US 2012/0053720 A1 Mar. 1, 2012

Related U.S. Application Data

(63) Continuation of application No. PCT/IB2009/007844, filed on Dec. 22, 2009.

(30) Foreign Application Priority Data

Feb. 13, 2009 (IN) .............................. 318/CHE/2009

(51) Int. Cl.
*G06F 19/00* (2011.01)
*D21C 11/12* (2006.01)
*G05B 13/04* (2006.01)

(52) U.S. Cl.
CPC .............. *D21C 11/12* (2013.01); *G05B 13/042* (2013.01)
USPC ................ 700/104; 700/128; 162/49; 162/72

(58) Field of Classification Search
USPC ................................ 700/104, 128; 162/49, 72
See application file for complete search history.

(56) References Cited

U.S. PATENT DOCUMENTS

| 5,715,158 | A * | 2/1998 | Chen .............................. 700/30 |
| 6,950,777 | B1 | 9/2005 | Lilburn et al. |
| 2002/0069982 | A1* | 6/2002 | Speaks et al. .................... 162/25 |
| 2003/0045962 | A1* | 3/2003 | Eryurek et al. ............... 700/128 |
| 2003/0192660 | A1* | 10/2003 | Speaks et al. .................... 162/72 |
| 2005/0034824 | A1* | 2/2005 | Lampela ......................... 162/49 |
| 2005/0154477 | A1* | 7/2005 | Martin et al. ................... 700/37 |

FOREIGN PATENT DOCUMENTS

| DE | 19 643 884 A1 | 5/1998 |
| EP | 0 590 430 A2 | 4/1994 |
| SU | 773 175 A1 | 10/1980 |
| SU | 1 608 277 A2 | 11/1990 |

(Continued)

OTHER PUBLICATIONS

International Search Report (PCT/ISA/210) issued on Apr. 27, 2010, by Indian Patent Office as the International Searching Authority for International Application No. PCT/IB2009/007844.

(Continued)

*Primary Examiner* — Mohammad Ali
*Assistant Examiner* — Anthony Whittington
(74) *Attorney, Agent, or Firm* — Buchanan Ingersoll & Rooney PC

(57) ABSTRACT

A method and a system for optimization of parameters for a recovery boiler in a pulp mill are disclosed. An exemplary method is based on use of a first principle mathematical model to estimate parameters that are otherwise not measurable, to accurately control the performance of the recovery boiler. In addition, a method is disclosed to use estimated parameters of a recovery boiler to control and stabilize the processes downstream of the recovery boiler. A system is also disclosed to carry out a method for control and optimization of performance and operational parameters of a recovery boiler.

15 Claims, 3 Drawing Sheets

(56) References Cited

FOREIGN PATENT DOCUMENTS

| WO | WO 97/13916 A2 | 4/1997 |
| WO | WO 98/27474 A1 | 6/1998 |
| WO | WO 2005/019526 A2 | 3/2005 |

OTHER PUBLICATIONS

International Preliminary Report on Patentability (PCT/IPEA/409) issued on May 27, 2011, by Indian Patent Office as the International Searching Authority for International Application No. PCT/IB2009/007844.

* cited by examiner

METHOD AND A SYSTEM FOR OPTIMIZATION OF PARAMETERS FOR A RECOVERY BOILER

RELATED APPLICATIONS

This application claims priority as a continuation application under 35 U.S.C. §120 to PCT/IB2009/007844, which was filed as an International Application on Dec. 22, 2009 designating the U.S., and which claims priority to Indian Application 318/CHE/2009 filed in India on Feb. 13, 2009. The entire contents of these applications are hereby incorporated by reference in their entireties.

FIELD

The present disclosure relates to a system and method for optimization of a recovery boiler process, such as the optimization of a recovery boiler process used in pulp mills.

BACKGROUND

A recovery boiler is a major component in the recovery cycle of black liquor, that is formed during a digester process and other pulp making processes. The black liquor contains dissolved organic compounds (from wood) and inorganic compounds ($NaOH$, $Na_2S$, $Na_2CO_3$ and $Na_2SO_4$). $Na_2S$ and $NaOH$ are chemicals used for the pulp making process in a digester. $Na_2CO_3$ and $Na_2SO_4$ are undesirable chemical species. A recovery boiler recovers $Na_2S$ from $Na_2SO_4$ via reduction reactions at the bottom of the recovery boiler furnace. $NaOH$ is recovered from $Na_2CO_3$ in a causticizing process subsequent to the recovery boiler. The recovered stream from the recovery boiler and causticizer contains $NaOH$ and $Na_2S$ as major species and is fed back to the digester for pulp making process.

To summarize, a recovery boiler is used to: (i) recover inorganic cooking chemicals; (ii) generate heat energy by burning the organic materials derived from the wood; and (iii) burn the organic chemicals in order not to discharge them from the mill, as pollutants. Through the recovery boiler process, the pulp mill saves on chemical cost and hence the recovery boiler (and also causticizer) can increase the economic performance of the pulp mill.

The chemical recovery boiler is a major component of the liquor cycle in a pulp mill and an important key to overall mill economic performance. Several issues add to the importance and complexity of recovery boiler operations. The variations in the calorific value (Btu content) and the temperature of black liquor, the size of the black liquor droplets, temperature and the distribution of combustion air can result in the varied performance of the boiler that in turn can affect the quality of the steam generated and the emissions from the boiler. The intensely coupled phenomena taking place inside the recovery boiler make it more difficult to operate the process at an optimum. The optimum performance of the boiler implies maximum reduction efficiency to recover the cooking chemicals, reduced emissions from the boiler and maintaining the steam quality at the desired level. Thus, it would be desirable to develop a method that considers all the above factors to ensure optimum performance of the boiler.

A modern day pulp mill uses sophisticated control systems, for example, a Distributed Control System (DCS), to regulate and optimize various processes related to the pulp mill. The DCS can also be used to optimize operations and production involved in the manufacture of pulp and paper. The control and optimization strategies can be based on modeling and simulation modules available with the DCS. A variety of process models are known from the literature, including models for a recovery boiler and mainly new modules based on these models that are available as software/hardware (mostly as software) solutions for the DCS positioned for pulp and paper mills.

Process models for a recovery boiler as known from the literature are either first principle based models or data driven models. These models are used for off-line simulations and, for control and optimization applications. The models used for control and optimization applications need to be mathematically simple enough to guarantee convergence and at the same time mathematically complex enough to capture the important dynamics and relationships among the required process variables. The data driven models have the advantage that they are mathematically simple but the use of these models is restricted to a narrow operating region of the recovery boiler. The first principle based models have the advantage that they capture the physics of the problem and thus their model predictions are reliable for a wide range of operating conditions of the recovery boiler. Hence the first principle based models are desired if they can be formulated and utilized.

A major challenge lies in the control of a reduction process inside the recovery boiler. Direct measurements of chemicals, $NaOH$, $Na_2S$, $Na_2CO_3$ and $Na_2SO_4$ are not available in the recovery boiler. Therefore, it is difficult to get a direct estimate of reduction efficiency in the recovery boiler that depends on the concentration of the above mentioned chemicals. The data driven models use an indirect measure of the reduction efficiency (i.e., the temperature of the char bed at the bottom of the furnace in the recovery boiler). But, reduction efficiency also depends on several other factors such as the availability of oxygen at the bottom of the bed, the chemical composition of the black liquor entering the furnace of recovery boiler, drying, volatilization and combustion reactions that take place during the flight of black liquor from the liquor nozzles to the char bed. All of these phenomena mentioned above affect the concentration of the chemical species (carbon, $NaOH$, $Na_2S$, $Na_2CO_3$ and $Na_2SO_4$) that reach the char bed and hence affect the reduction reaction rate. Therefore, data driven models that assume char bed temperature as the measure of reduction process may be inaccurate for control of reduction process.

The inefficiency of the data driven models to accurately predict the reduction reaction rate and their inability to capture the dependence of the reduction process on the various process variables of the recovery boiler result in inefficient control and optimization of the recovery boiler process. As various coupled phenomena, such as combustion, char volatilization and reduction occur in the recovery boiler, the data driven models are not able to efficiently control and optimize the recovery boiler process. This results in poor reduction efficiency, poor combustion and higher emission of the pollutants from the recovery boiler. All these factors add to the cost of the pulp mill.

Thus, there is a strong need to develop a method and a system that can accurately predict the process variables, including the concentration of chemical species in the recovery boiler, and also efficiently control and optimize the recovery boiler process.

SUMMARY

A method is disclosed for optimization of one or more boiler parameters in a recovery boiler process, the method comprising:

(i) providing a process model describing a relationship between process variables for one or more units of a recovery boiler system;
(ii) estimating one or more boiler parameters of one or more units of the recovery boiler system;
(iii) using the one or more boiler parameters to develop at least one objective function for optimization; and
(iv) optimizing the objective function for control of the one or more boiler parameters of the recovery boiler system, wherein the estimating of the one or more boiler parameters includes using the process model describing the relationship for estimation of sulfate concentration and/or sulfide concentration in a reduction reaction of the recovery boiler process, and/or using process variable data obtained from on-line measurements made in the units of the recovery boiler system and/or made by lab measurement.

A system is also disclosed for optimization of one or more boiler parameters in a recovery boiler process, the system comprising:
(i) a process model component having a process model describing a relationship between process variables for one or more units of a recovery boiler system;
(ii) a parameter estimation component to estimate at least one unit parameter of a recovery boiler system using the process model component;
(iii) an optimization component to perform computation for optimization of one or more boiler parameters using the process model component and the parameter estimation component; and
(iv) a controller component to control one or more boiler parameters having one or more setpoints provided by the optimization component, wherein the parameter estimation component estimates the one or more unit parameters using the process model that describes the relationship for estimation of sulfate concentration and/or sulfide concentration in a reduction reaction of a recovery boiler process, and/or using process variable data to be obtained from on-line measurements made in units of the recovery boiler system and/or to be made by lab measurement.

A control system is also disclosed for paper and pulp process, comprising:
(i) a process model component having a process model describing a relationship between various process variables for at least one unit from a first set of units;
(ii) a parameter estimation component to estimate at least one unit parameter of the first set of units using the process model component; and
(iii) a controller component to control a second set of one or more units based on the estimated at least one unit parameter, wherein the parameter estimation component estimates the said one or more unit parameters using the said process model that describes the relationship for estimation of sulfate concentration and/or sulfide concentration in a reduction reaction of a recovery boiler process, and/or using process variable data obtained from on-line measurements made in units of a recovery boiler system and/or made by lab measurement.

A system is also disclosed for estimation and prediction of one or more boiler parameters for a recovery boiler comprising:
(i) a process model component having a process model describing a relationship between process variables of a recovery boiler system;
(ii) a parameter estimation component to estimate at least one boiler parameter using the process model component; and
(iii) a prediction component to predict one or more trajectories of boiler parameters over a defined prediction time period using the process model component and the parameter estimation component, wherein the parameter estimation component estimates the one or more boiler parameters using the process model that describes the relationship for estimation of sulfate concentration and/or sulfide concentration in a reduction reaction of a recovery boiler process, and/or using process variable data obtained from on-line measurements made in units of the recovery boiler system and/or made by lab measurement.

BRIEF DESCRIPTION OF THE DRAWING

The appended drawings illustrate exemplary embodiments of the invention and are therefore not to be considered limiting of its scope, for the invention encompasses other equally effective embodiments.

DETAILED DESCRIPTION

Figure 1:
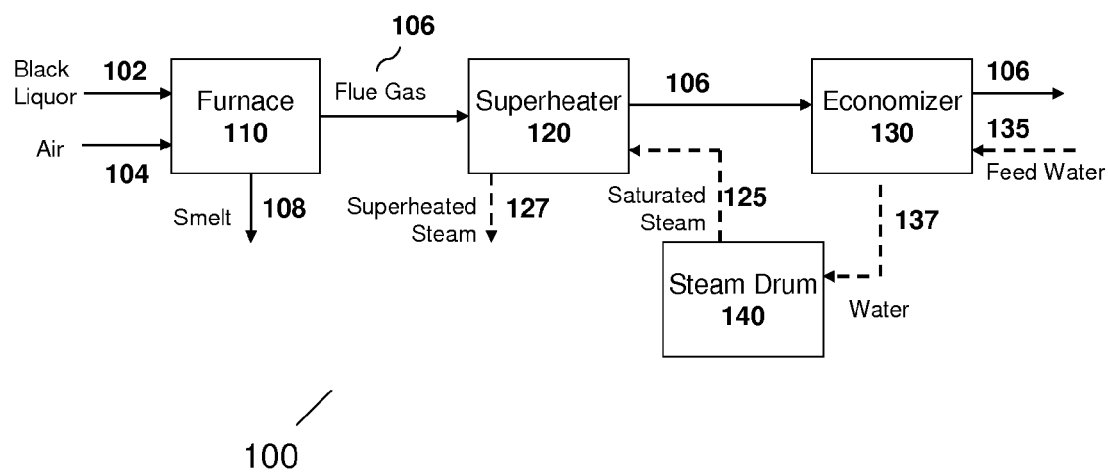
FIG. 1 shows a known recovery boiler process and the various units of a recovery boiler process.

Exemplary embodiments as disclosed herein are directed to prediction and optimization of overall performance of a recovery boiler.

A model based completely or partially on first principles can be used that reflects the relationship between all of the manipulated and controlled variables of the recovery boiler.

An objective function can be formulated to optimize parameters related to performance and operation of a recovery boiler process.

A model can be used to estimate and predict recovery boiler parameters that are not available from on-line measurements.

The process variables can be used in optimization as well as in monitoring performance and operational parameters of the recovery boiler.

The estimated and predicted boiler parameters can be used to control or stabilize the processes downstream of the recovery boiler.

A method and a system are disclosed for optimization of parameters for a recovery boiler in a pulp mill. An exemplary method is based on use of a first principle mathematical model to estimate parameters that are otherwise not measurable to accurately control the performance of the recovery boiler. The estimated parameters and the developed models are used to optimize performance and operational parameters in a pulp mill, such as of the recovery boiler.

In an exemplary aspect, a method is disclosed for optimization of one or more boiler parameters in a recovery boiler process. The method comprises:
(i) providing a process model describing a relationship between various process variables for one or more units of the recovery boiler system;
(ii) estimating one or more boiler parameters of one or more units of the recovery boiler system;
(iii) using the one or more boiler parameters to develop at least one objective function for optimization; and
(iv) optimizing the objective function for control of the one or more boiler parameters of the recovery boiler;

wherein, the estimating of the one or more boiler parameters comprises using the process model that includes the relationship for estimation of sulfate concentration and/or sulfide concentration in the reduction reaction of the recovery boiler process, and/or using process variable data obtained from online measurements made in the various units of the recovery boiler system and/or lab measurement.

In an exemplary embodiment, the method for optimization of one or more boiler parameters is applied to parameters comprising performance parameters such as reduction efficiency, combustion efficiency, steam quality, and heat loss; operational parameters such as cost of boiler operation; and parameters that are not directly measurable such as sulfate concentration, and sulfide concentration in a unit of the recovery boiler system.

In another exemplary embodiment, the method for optimization of one or more boiler parameters is carried out with formulation of an objective function with at least one boiler parameter comprising terms describing reduction efficiency, combustibles in flue gas going out of the boiler or the quality of the superheated steam or the excess oxygen control for better heat utilization or a combination of any of these.

In another exemplary aspect, a system for optimization of one or more boiler parameters in a recovery boiler process is provided. The system comprises:
(i) a process model component having a process model describing a relationship between various process variables for one or more units of the recovery boiler system;
(ii) a parameter estimation component to estimate at least one unit parameter of the recovery boiler system using the process model component;
(iii) an optimization component to perform computation for optimization of one or more boiler parameters using the process model component and the parameter estimation component; and
(iv) a controller component to control one or more boiler parameters having one or more setpoints provided by the optimization component;
wherein the parameter estimation component estimates the one or more unit parameters using the process model that includes the relationship for estimation of sulfate concentration and/or sulfide concentration in the reduction reaction of the recovery boiler process, and/or using process variable data obtained from on-line measurements made in the various units of the recovery boiler system and/or lab measurement.

In another exemplary aspect, a control system for paper and pulp process is provided. The control system comprises:
(i) a process model component having a process model describing a relationship between various process variables for at least one unit from a first set of units;
(ii) a parameter estimation component to estimate at least one unit parameter of the first set of units using the process model component; and
(iii) a controller component to control a second set of one or more units based on the estimated at least one unit parameters;
wherein, the parameter estimation component estimates the one or more unit parameters using the process model that includes the relationship for estimation of sulfate concentration and/or sulfide concentration in the reduction reaction of the recovery boiler process, and/or using process variable data obtained from on-line measurements made in the various units of the recovery boiler system and/or lab measurement.

As an exemplary embodiment, the control system in a paper and pulp process has the first set of units that are of a recovery boiler system and the second set of units are of a green liquor clarifier or causticizer system.

In another exemplary embodiment of the system for control in a paper and pulp process, the first set of units and the second set of units have at least one unit in common.

In another exemplary aspect, a system for estimation and prediction of one or more boiler parameters for a recovery boiler is provided. The system comprises:
(i) a process model component having a process model describing a relationship between various process variables of recovery boiler system;
(ii) a parameter estimation component to estimate at least one boiler parameter using the process model component; and
(iii) a prediction component to obtain one or more trajectories of boiler parameters over a defined prediction time period using the process model component and the parameter estimation component;
wherein the parameter estimation component estimates the one or more boiler parameters using the process model that includes the relationship for estimation of sulfate concentration and/or sulfide concentration in the reduction reaction of the recovery boiler process, and/or using process variable data obtained from on-line measurements made in the various units of the recovery boiler system and/or lab measurement.

In another exemplary embodiment, the relationship defined in the process model, parameters estimated by the parameter estimation component or parameters predicted by the prediction component are used to develop an objective function or used as a constraint for obtaining an optimization solution.

In another exemplary embodiment, the methods and systems as described herein can use process models formulated using means such as that based completely or partially on first principles; empirical rules or data; stochastic; algorithmic models or the combinations as hybrid models.

Thus, a method and a system are disclosed to predict process variables such as concentration of chemical species involved in the recovery boiler processes with improved accuracy. The method and the system can be extended beyond the recovery boiler system to improve control of many other units in the paper and pulp process.

FIG. 1 illustrates an exemplary known recovery boiler system 100. The recovery boiler system 100 can include various units such as the Furnace 110 (Combustion chamber), Superheater 120, Economizers 130 and Steam Drum 140. The recovery boiler system 100 can also be referred to as recovery boiler plant.

(A) Furnace

The unit of the recovery boiler where the black liquor 102 is fired and burnt is the furnace 110. There is a bed of smelt 108 at the bottom of the furnace 110 where the reduction reactions take place that reduces the sulfates to sulfides ($Na_2SO_4 + 4C = Na_2S + 4CO$). The carbonaceous material in black liquor 102 is gasified and oxidized by the combustion air 104 entering the furnace 110 at different locations. Air 104 is also expressed as oxygen and interchangeably used in the description. The component analysis of the black liquor 102 can be treated as an important aspect in model formulation. Because the composition of the black liquor 102 remains almost constant, continuous input for component analysis is not required. The fractions of various components of the black liquor 102 are treated as being deterministic. Black Liquor 102 is considered to have components such as Sodium, Carbon, Hydrogen, Sulfur, Oxygen, Nitrogen, and Water. It is assumed that 50% of sulfur is released as $H_2S$ during devolatilization of black liquor 102 inside the furnace 110. The remaining sulfur is assumed to be present in the form of $Na_2S$ and $Na_2SO_4$ at a known molar ratio. This initial concentration ratio of $Na_2S$ and $Na_2SO_4$ in the black liquor char is set to be, for example, 1:1. The remaining sodium is assumed to form $Na_2CO_3$. During devolatilization of black liquor inside the furnace 110, a known fraction of carbon is assumed to be released as different gaseous compounds. The fraction of carbon in black liquor 102 that goes into these compounds is assumed to be 50%, which is based on small scale experiments. In the current model the carbon containing gases are assumed to be CO, $CO_2$ and $CH_4$. The total amount of CO and $CO_2$ in the volatile gases depends upon the available oxygen chemically bound in the virgin black liquor still left after formation of the oxygen containing components ($Na_2CO_3$, $Na_2SO_4$), as described above. A mole ratio for [CO]/[CO2] is defined as a constant for model formulation. Hydrogen present in black liquor 102 is assumed to be released as $H_2$.

The rate of the reaction for heterogeneous reactions in the furnace 110 is treated to be dependent on both mass transfer and the reaction kinetics. The rate of mass transfer is assumed to be inversely proportional to the square of the diameter of black liquor 102 drops. The sulfate reduction rate is primarily controlled by the reaction kinetics. The sodium sulfide present in the black liquor solids and in the smelt is assumed to be easily oxidized when in contact with oxygen.

For the gas phase reactions, it is assumed that the reactions involving $CH_4$ and $H_2$ are very fast and all of hydrogen and methane is consumed first. The rate of oxidation of CO is assumed directly proportional to the concentration of CO and $O_2$ inside the furnace 110.

The mathematical model of the furnace 110 is described by equation (eq 1) below:

$$\frac{dx}{dt} = f(x, p, y) \quad \text{(eq 1)}$$

Term x, in equation (eq 1), is the variable of interest such as temperature, pressure and concentrations of various chemical species like $Na_2SO_4$, $Na_2S$, NaOH, $Na_2CO_3$, CO, $CO_2$ inside the furnace 110. Function f described by $f(x, p, y)$ in equation (eq 1) is the mathematical representation of phenomena affecting the variable x in the furnace. Term p in equation (eq 1) represents a constant associated with structural aspects of the furnace, eg volume of the furnace. Term y, in equation (eq 1) represents physical factors that affect $f(x, p, y)$. The physical factors are described in the model as per equation (eq 2) as a function 'g' of term 'x' and 'p'.

$$y = g(x, p) \quad \text{(eq 2)}$$

An example of the physical factors is the droplet size of the black liquor 102 entering the furnace 110 through nozzles located at the walls of the furnace 110. The black liquor 102 droplet size is calculated in the model based on the viscosity of the black liquor and the nozzle size. The droplet size determines the rate of gasification reactions that convert carbon in the black liquor to CO and $CO_2$ and the rate of reduction reactions.

The solution of these equations gives the concentration of various components and variables of interest such as temperature inside the furnace 110.

(B) Superheater

The furnace 110 is followed by a series of heat exchangers to transfer the heat from the hot flue gas 106 to the water. Superheater 120 is the heat exchanger that experiences the hottest flue gas because it is next to the furnace 110. This unit of the recovery boiler is used to superheat the steam coming from steam drum 140, and hence is called the superheater 120. The mathematical model of the superheater is also represented in similar manner as in equations (eq 1) and (eq 2). The model includes the heat balance equations that determine the rate of heat transfer from flue gas 106 to the saturated steam 125 and hence determines the temperature of the superheated steam 127 leaving the superheater 120. Attemperators (not shown the figure) can also be used to maintain the temperature of the steam by showering water.

(C) Steam Drum

Steam Drum 140 is that unit of the recovery boiler that receives the radiative heat from the furnace 110 and thus generates the steam from the water 137 coming from the economizers 130. The mathematical model of the steam drum 140 includes the energy balance and the two phase equilibrium equation for steam-water to predict the rate of evaporation. The pressure difference between the steam drum 140 and superheater 120 is calculated which is used to determine the flow rate of the saturated steam 125 out of the steam drum. The mathematical model of the superheater is also represented in similar manner as in equations (eq 1) and (eq 2).

(D) Economizer

Economizer 130 is the unit of the recovery boiler that is used to preheat the feedwater 135 before it goes to the steam drum 140. The heat exchange takes place between the flue gas 106 coming from the superheater 120 and the feed water 135. There are, for example, multiple units of the economizer to heat the water to near its saturation temperature. The model of the economizer 130 can include the energy balance equations. The heat transfer is considered to occur via convection between the flue gas 106 and feed water 135. The mathematical model of the superheater is also represented in similar manner as in equations (eq 1) and (eq 2).

The following terms are used throughout the description, the definitions of which are provided herein to assist in understanding various aspects of the subject innovation. It is to be understood that this definition is not intended to limit the scope of the disclosure and claims appended hereto in any way.

Reduction efficiency refers to an efficiency of the reduction reactions taking place in the boiler that, for example, convert sulfates present in the boiler feed to sulfides.

The reduction efficiency is, for example, calculated with:

$$\text{Reduction Efficiency} = \left(\frac{\text{Sulfide}}{\text{sulfide} + \text{sulfate}}\right)_{smelt}$$

Combustion efficiency refers to the efficiency of the combustion process of, for example, the organics inside the furnace section of the recovery boiler.

Steam quality refers to the temperature and pressure of steam, such as superheated steam formed inside the recovery boiler.

Reduction efficiency can be the measure of conversion of $Na_2SO_4$ to $Na_2S$. This reduction reaction occurs in the char bed at the bottom of the recovery boiler. Like any other reaction rate, the reduction rate depends on the temperature of the bed. Due to unavailability of on-line measurements of $Na_2S$ and $Na_2SO_4$, it is difficult to predict and control the reduction efficiency. A known practice of controlling (or maximizing) reduction efficiency uses the bed temperature as the only variable to get an indirect measure of the reduction efficiency. But, reduction efficiency also can depend on several other factors such as the availability of oxygen at the bottom of the bed. Other factors that can affect reduction phenomenon are, the chemical composition of the black liquor entering the furnace of recovery boiler, drying, volatilization and combustion reactions that take place during the flight of black liquor from the liquor nozzles to the char bed. All these phenomena mentioned above affect the concentration of the chemical species (carbon, NaOH, Na2S, Na2CO3 and Na2SO4) that reach the char bed and hence affect the reduction reaction rate.

If the stream that is fed back to the digester from recovery processes contains more undesirable species ($Na_2CO_3$ and $Na_2SO_4$), the efficiency of the digester goes down and the mill can end up using more chemicals for achieving the same quality of pulp produced from digester. Hence, the reduction efficiency (of reduction reaction, $Na_2SO_4$ to $Na_2S$) should be maintained as high value as possible ~99% and the variations in it should be minimized so as to minimize the variations in the quality of the pulp produced from the digester.

The combustion efficiency is monitored via either the level of pollutants such as CO, $NO_x$ in the flue gas leaving the recovery boiler plant 100 or the level of excess oxygen measured in the flue gas leaving the recovery boiler plant 100. The measurements of the pollutants, particulate carbon, and excess level of oxygen in the flue gas are some performance parameters that can be used to monitor the combustion efficiency of the recovery boiler plant 100.

These aspects can be important in defining rules for optimization of performance and operation of the recovery boiler system 100.

The recovery boiler process model formulated as described earlier can be used for optimal control of performance and operation of the recovery boiler system 100. One exemplary preferred formulation of the objective function is:

$$e^T W_e e + \Delta u^T W_u \Delta u \text{ subject to constraints}$$

Where,
e=error vector
$\Delta u$=vector of changes in manipulated variables 'u'
$W_e$=weight matrix for error vector
$W_u$=weight matrix for manipulated variables The error vector 'e' in the object function can include various terms that quantify a difference in desired and actual performances of the recovery boiler system. One exemplary way of defining the error vector is as follows:

$$e = \begin{bmatrix} \text{Actual reduction efficiency} - \text{Desired reduction efficiency} \\ \text{Actual Steam Temperature} - \text{Desired Steam Temperature} \\ \text{Actual level of combustibles} - \text{Desired level of combustibles} \\ \text{Actual level of excess oxygen} - \text{Desired level of excess oxygen} \\ \text{Actual char bed height} - \text{Desired char bed height} \end{bmatrix}$$

The above formulation of an error vector ensures that the combustibles, steam temperature and reduction efficiency are maintained at the desired level along with the optimum usage of air (oxygen) and optimum char bed height. It is to be noted that this formulation can be used to optimize performance of the recovery boiler system.

Other formulations include operational parameters such as cost of recovery boiler operation or the formulation for performance is used in combination with operational parameters of recovery boiler operation.

It is to be noted that some of the variables and parameters used in the error vector like steam temperature, level of combustibles are measured and some other variables and parameters like reduction efficiency, char bed height are estimated from the model. It is also to be noted that for some of the variables such as char bed height there is a choice to either compute it using the model in cases where no direct measurement is made. The variables or parameters that are estimated by use of the model are termed as estimated parameters.

The parameters such as performance parameters, operational parameters, measured and estimated parameters are termed as boiler parameters. Parameters concerned with a specific unit of the recovery boiler system or with the paper and pulp industry are referred to as unit parameters.

Exemplary constraints for the optimization are:
(i) Furnace Pressure<P
(ii) Black liquor temperature>T
(iii) $Q_2$<Black Liquor flow rate<$O_1$
(iv) $F_2$<Air flow at various levels<$F_1$
(v) Black Liquor Droplet size>D
(vi) Steam drum level>L These constrained variables can be either measured directly in the recovery boiler system or inferred from the recovery boiler model. P, T, Q1, F1, D and L are exemplary reference quantities. The manipulated variables (denoted as 'u' in objective function) can be chosen to keep the outputs at desired levels or to keep the error (e) at a minimum. These manipulated variables are the process variables of the recovery boiler. Some examples of the manipulated variables are Black Liquor Temperature, Air flow, Air Temperature, Inlet Water flow to economizers and Attemperator flow. The term process variable is used to indicate all the variables associated with the process model for which relationships are defined through the definitions in the process model. The value of the process variable is termed as process variable data.

Figure 2:
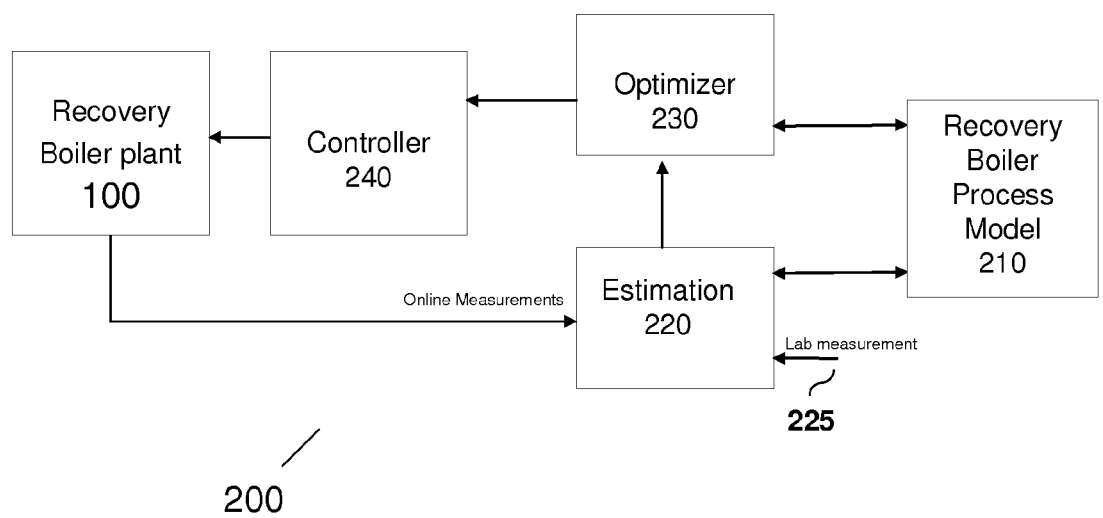
FIG. 2 shows a schematic representation of exemplary on-line-optimization system of a recovery boiler process.

FIG. 2 illustrates an exemplary system 200 for control and optimization of a recovery boiler process. A first principle based process model of the recovery boiler system 100 is used as a central component for control and optimization of the recovery boiler system 100. The process model is available in the form of a software module known as process model component 210. Other components, known as parameter estimation component 220, are developed for estimation of certain boiler parameters that are either not measurable or involve some form of computation for estimation. The parameter estimation component 220 is developed using the relationships defined in the process model or formulations as defined for performance parameters. The parameter estimation component also uses data from on-line measurements and laboratory analysis 225 (data entered in the system at periodic intervals) to fine tune process model parameters (also referred as model parameters) of the process model to ensure a close match between the actual process/phenomena in the recovery boiler system. Such a fine tuning can be performed on a regular basis as considered suitable for operation. The on-line and laboratory measurements (eg. Total Titrable Alkali in smelt or green liquor) are also used by the estimation module 220 to calculate the concentration of the chemical species, $Na_2SO_4$, $Na_2S$, NaOH, $Na_2CO_3$, in the smelt stream 108 going out from the bottom of the recovery boiler furnace 110. The parameter estimation component 220 also computes boiler performance parameters described in terms of reduction efficiency, combustion efficiency and the steam quality by using the recovery boiler model 210. Such estimations help in achieving better control of performance and operational parameters of the recovery boiler system.

It is to be noted that though the description is made with reference to model formulation based on first principles for the process model component and parameter estimation component, various other kinds of models may be used to achieve some or all the objectives mentioned herein. Example of these models are models that are partially based on first principles, models based on empirical rules or data; data driven models, stochastic models; algorithmic models such as those based on neural networks, genetic algorithms and the combinations as hybrid models.

The optimization component 230 uses the process model component 210 and parameter estimation component 220 to compute a solution for the optimization. The solution is expressed as a setpoint to one or more regulatory controllers 240 (e.g., a computer or dedicated processor and/or firmware or software) that control the recovery boiler processes.

Figure 3:
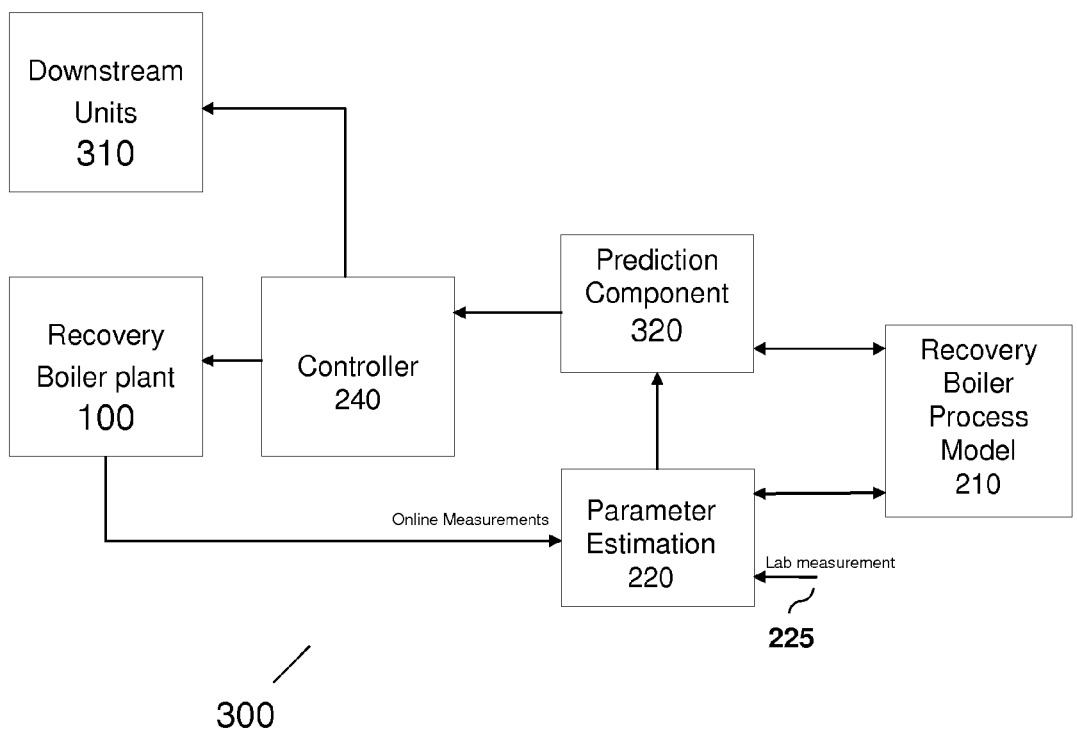
FIG. 3 shows a schematic of an exemplary control system for a paper and pulp process.

In another exemplary aspect, the control system for the recovery boiler system has a prediction component 320 such as the exemplary embodiment depicted in FIG. 3. The prediction component uses the recovery boiler process model 210 to predict the future trend of boiler parameters or unit parameters in the recovery boiler system. The prediction component 320 takes the current state of the recovery boiler plant 100 as an input from the estimation module 220 and then predicts performance parameters over a finite future time horizon. Thus, a prediction component is used to obtain one or more trajectories of boiler parameters over a defined prediction time period using the process model component and the parameter estimation component. The predicted values may be monitored by the production manager to assess the current and future performance of the recovery boiler plant 100. The prediction information may also be used by the optimization component 230 to solve the optimization determination.

The prediction component 320 output is also available for controllers controlling the operations of units outside the recovery boiler system, for example the downstream units 310. The predicted values from the prediction component can be used to provide set-points to the downstream units such as the green liquor clarifier and causticizer unit. For example, the knowledge of the composition of the smelt 108 coming out of the recovery boiler will help in stabilizing and controlling the alkali content of the liquor leaving the smelt dissolving tank which in turn results in improved performance of the causticizer unit. Since the residence times in the smelt dissolving tank, and clarifier tanks are large, on-line indications of the smelt 108 compositions can be of great help in stabilizing and controlling the composition of the green liquor going to the causticizer unit from clarifier unit, both downstream of the recovery boiler 100. It is to be noted that the green liquor clarifier unit and the causticizer unit may comprise multiple units, thus forming the green liquor clarifier system and causticizer system respectively. Information such as smelt 108 composition from the performance monitoring system 320 can be used as feed forward signals to control of the density/alkali of green liquor after the clarifier. Thus, information from units of the recovery boiler 100 can be used to control and optimize units of the paper and pulp mill that are outside the recovery boiler system 100. This information from units of the recovery boiler 100 is also useful to other systems that have at least one unit in common with the recovery boiler system.

Thus, the disclosed methods and systems can help to accurately estimate and predict the process variables including the concentration of chemical species in the recovery boiler system and thereby efficiently control and optimize the recovery boiler processes and other associated processes.

Various other modifications and alterations in the structures and methods of operation will be apparent to those skilled in the art without departing from the scope and spirit of this invention. Although the invention has been described in connection with specific preferred embodiments and specifically for the recovery boiler plant and downstream units used in paper and pulp industry, it should be understood that the invention as claimed is not limited to such specific embodiments or any particular plant system used in the paper and pulp industry.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

We claim:

1. A method for optimization of a plurality of boiler parameters in a recovery boiler process, the method comprising:
   (i) providing a process model describing a relationship between process variables for one or more units of a recovery boiler system, wherein the one or more units of the recovery boiler system includes a char bed;
   (ii) estimating the plurality of boiler parameters of the one or more units of the recovery boiler system;
   (iii) using the plurality of boiler parameters to develop at least one objective function for optimization; and
   (iv) optimizing the at least one objective function for control of the plurality of boiler parameters of the recovery boiler system, wherein the estimating of the plurality of boiler parameters includes using the process model describing the relationship for estimation of at least one of sulfate concentration, sulfide concentration in a reduction reaction of the recovery boiler process, and using process variable data obtained from on-line measurements made in the units of the recovery boiler system,
   wherein the plurality of boiler parameters includes one or more parameters associated with the char bed of the recovery boiler system.

2. The method for optimization of one or more boiler parameters as recited in claim 1, wherein the boiler parameters comprise a performance parameter; an operational parameter; and a parameter not directly measurable in a unit of the recovery boiler system.

3. The method for optimization of one or more boiler parameters as recited in claim 1, wherein the objective function is formulated with at least one boiler parameter comprising terms describing reduction efficiency, combustibles in flue gas going out of the boiler, quality of superheated steam, excess oxygen for better heat utilization, or any combination thereof.

4. A system for optimization of a plurality of boiler parameters in a recovery boiler process, the system comprising:
   (i) a process model component having a process model describing a relationship between process variables for one or more units of a recovery boiler system, wherein the one or more units of the recovery boiler system includes a char bed;
   (ii) a parameter estimation component to estimate at least one unit parameter of a recovery boiler system using the process model component;
   (iii) an optimization component to perform computation for optimization of the plurality of boiler parameters using the process model component and the parameter estimation component; and
   (iv) a controller component to control the plurality of boiler parameters having one or more setpoints provided by the optimization component,
   wherein the parameter estimation component estimates the one or more unit parameters using the process model that describes the relationship for estimation of at least one of sulfate concentration, sulfide concentration in a reduction reaction of a recovery boiler process, and using process variable data to be obtained from on-line measurements made in units of the recovery boiler system, and wherein the plurality of boiler parameters includes one or more parameters associated with the char bed of the recovery boiler system.

5. A control system for paper and pulp process, comprising:
(i) a process model component having a process model describing a relationship between various process variables for at least one unit from a first set of units, wherein the at least one unit is included in a recovery boiler system having a char bed;
(ii) a parameter estimation component to estimate at least one unit parameter of the first set of units using the process model component; and
(iii) a controller component to control a second set of one or more units based on the estimated at least one unit parameter, wherein the parameter estimation component estimates a plurality of unit parameters using the said process model that describes the relationship for estimation of at least one of sulfate concentration, sulfide concentration in a reduction reaction of a recovery boiler process, and using process variable data obtained from on-line measurements made in units of the recovery boiler system,
wherein the plurality of unit parameters includes one or more parameters associated with the char bed of the recovery boiler system.

6. The control system in a paper and pulp process as recited in claim 5, wherein the first set of units are of a recovery boiler system and the second set of units are of a green liquor clarifier or of causticizer system.

7. The system for control in a paper and pulp process as recited in claim 5, wherein the first set of units and the second set of units are have at least one unit in common.

8. A system for estimation and prediction of a plurality of boiler parameters for a recovery boiler comprising:
(i) a process model component having a process model describing a relationship between process variables of a recovery boiler system, wherein the recovery boiler system includes a char bed;
(ii) a parameter estimation component to estimate at least one boiler parameter using the process model component; and
(iii) a prediction component to predict one or more trajectories of boiler parameters over a defined prediction time period using the process model component and the parameter estimation component, wherein the parameter estimation component estimates the plurality of boiler parameters using the process model that describes the relationship for estimation of at least one of sulfate concentration, sulfide concentration in a reduction reaction of a recovery boiler process, and using process variable data obtained from on-line measurements made in units of the recovery boiler system,
wherein the plurality of boiler parameters includes one or more parameters associated with the char bed of the recovery boiler system.

9. The system as recited in claim 8, wherein the relationship described in the process model, parameters estimated by the parameter estimation component, and/or parameters predicted by the prediction component are used to develop an objective function or used as a constraint for obtaining an optimization solution.

10. The method as recited in claim 1, wherein the process model for a recovery boiler is based completely or partially on first principles; empirical rules or data; stochastic; or algorithmic models, neural networks, genetic algorithms, or any combination thereof as hybrid models.

11. The method for optimization of one or more boiler parameters as recited in claim 2, wherein the performance parameter is one or more of reduction efficiency, combustion efficiency, steam quality, and heat loss; the operational parameter is boiler operation; and the parameters that are not directly measurable are sulfate concentration, and sulfide concentration in a unit of the recovery boiler system.

12. A system for optimization of one or more boiler parameters in a recovery boiler process according to claim 4, in combination with a boiler recovery system.

13. The method as recited in claim 10, wherein the process model is used to model at least one of a process reduction process, a combustion process in a furnace of the recovery boiler system, a process of generation of superheated steam in a superheater unit, and an economizer unit of the recovery boiler system.

14. The system as recited in claim 4, wherein the process model for a recovery boiler is based completely or partially on first principles; empirical rules or data; stochastic; or algorithmic models, neural networks, genetic algorithms, or any combination thereof as hybrid models.

15. The system as recited in claim 14, wherein the process model is used to model at least one of a process reduction process, a combustion process in a furnace of the recovery boiler system, a process of generation of superheated steam in a superheater unit, and an economizer unit of the recovery boiler system.

* * * * *